United States Patent [19]

Su

[11] Patent Number: 4,812,504

[45] Date of Patent: Mar. 14, 1989

[54] COMPOSITIONS AND EXTRUDED ARTICLES COMPROMISING POLYOLEFIN, POLYAMIDE AND FATTY ACID AMIDE

[75] Inventor: Tien-Kuei Su, Belle Mead, N.J.

[73] Assignee: Mobil Oil Corporation, New York, N.Y.

[21] Appl. No.: 87,078

[22] Filed: Aug. 19, 1987

[51] Int. Cl.$^4$ .................. C08K 5/20; C08L 23/18; C08L 23/06; C08L 63/00

[52] U.S. Cl. .................. 524/229; 524/514

[58] Field of Search ............. 524/227, 229, 232, 514; 525/184

[56] References Cited

U.S. PATENT DOCUMENTS

| | | | |
|---|---|---|---|
| 2,770,609 | 11/1956 | Symonds | 524/229 |
| 3,021,296 | 2/1962 | Ammondson | 524/229 |
| 3,165,492 | 1/1965 | Tholstrup | 524/229 |
| 3,969,304 | 7/1976 | Pugh | 524/229 |
| 4,322,503 | 3/1982 | Chatterjee | 524/229 |
| 4,383,084 | 5/1983 | Paschke | 525/184 |
| 4,444,829 | 4/1984 | Bollen | 525/184 |
| 4,447,572 | 5/1984 | Scharf | 525/183 |
| 4,490,324 | 12/1984 | Mollison | 524/227 |
| 4,607,072 | 8/1986 | Su | 524/242 |
| 4,701,487 | 10/1987 | Hakim | 524/229 |

FOREIGN PATENT DOCUMENTS

| | | | |
|---|---|---|---|
| 3200428 | 7/1983 | Fed. Rep. of Germany | 524/229 |
| 39-27629 | 2/1964 | Japan | 525/184 |
| 57-5752 | 1/1982 | Japan | 524/229 |
| 1081347 | 8/1967 | United Kingdom | 525/184 |

*Primary Examiner*—C. Warren Ivy
*Attorney, Agent, or Firm*—Alexander J. McKillop; Charles J. Speciale

[57] ABSTRACT

The processability of blends of linear polyolefins (particularly HDPE or LLDPE) and condensation polymers (particularly nylon) into extrudates is improved by the addition of small amounts of a fatty acid derivative such as fatty acid amide. The addition of fatty acid derivative results in reduced extruder torque and gives extrudates with smoother surfaces.

4 Claims, No Drawings

COMPOSITIONS AND EXTRUDED ARTICLES COMPROMISING POLYOLEFIN, POLYAMIDE AND FATTY ACID AMIDE

BACKGROUND OF THE INVENTION

Linear polyethylene resins including high density polyethylene (HDDP) and linear low density ethylene copolymers (LLDPE) are difficult to process through conventional extrusion equipment designed for branched polyethylene prepared by high pressure polymerization. Linear polyethylenes are extruded at lower output rates because of high head pressure and power consumption. This is necessary because of their melt rheological characteristics, particularly high shear viscosity. In addition, linear polyethylene films and bags often exhibit poor appearance due to melt fracture. It has been concluded that the melt fracture mechanism for linear polyethylenes is different from the branched species. Furthermore, the use of linear polyethylenes in clear film packaging is limited because of its poor optical properties. The optical properties of linear polyethylene films is related to the rheological behavior of the melt and the morphological nature of the resin.

In many applications blends of linear polyethylenes with polyamides are desirable to obtain improved physical properties and barrier properties. But blends of linear polyolefins and polyamides are also diffcult to extrude and the the extrudates exhibit the same or similar defects as observed when linear polyethylenes are extruded alone. My U.S. Pat. No. 4,607,072 which is incorporated herein by reference discloses the use of fatty acid amides as additives to linear polyolefins for the purpose of improving processability of linear polyolefins particularly in the extrusion of films.

In accordance with this invention fatty acid derivatives such as fatty acid amides are added to blends of linear polyethlenes and polyamides to achieve better processing characteristics.

SUMMARY OF THE INVENTION

Polymer compositions comprising a linear polyethylene, a polyamide and a fatty acid amide have better processing characteristics than corresponding compositions without the fatty acid amide. The compositions are more easily extruded into articles such as filaments and films and the articles produced are superior in appearance than those made with blends which do not contain fatty acid amide.

DETAILED DESCRIPTION OF THE INVENTION

The polyolefins which are particularly suitable for use in this invention are the linear homopolymers of ethylene and of propylene and the linear copolymers of ethylene and higher olefins especially butene, hexene and octene.

The polymeric polyamides are advantageously chosen from the class of polyamides known as nylons which are tough fiber forming polymers. Polycaprolactam and polyhexamethylene adipamide are particularly useful.

The fatty acid derivative component is generally described in U.S. Pat. No. 4,607,072 which is incorporated herein by reference. Fatty acid amides particularly diamides of alkylene diamines such as N,N'-ethylene bis-oleamide are especially suitable.

The proportions of the essential three components can vary widely providing that a sufficient amount of the fatty acid amide or other fatty acid derivative is present to provide improved extrudability for the polyolefin-polyamide blend. Generally, amounts of the fatty acid derivative such as preferred fatty acid diamides are in the range of 0.2 to 5 weight percent of the composition and usually in the range of 0.4 to 2 weight percent.

The polyolefin generally comprises at least 50 weight percent of the composition and the benefits of the polyamide are obtained when it is present in amounts of at least 5 weight percent. Typical compositions contain 60 to 90 weight percent of a polyolefin such as a linear ethylene polymer, 10 to 40 weight percent of polyamide and 0.4 to 2 weight percent of the fatty acid derivative.

The invention is illustrated by the following examples in which all parts are by weight unless otherwise indicated.

EXAMPLES 1-3

A series of polyethylene/polyamide blends (80/20) including a control (C) with no fatty acid amide and similar blends in accordance with this invention containing 0.5%, 1% and 2% fatty acid amide, were prepared at various shear rates. The polyethylene was high density polyethylene (TR-130 from Phillips Petroleum), the polyamide was nylon-6 (Capron 8207F from Allied Chemical) and the fatty acid amide was N,N'-ethylenebisoleamide (Kenamide W-20 from Witco Chemical). The improvement of processability during extrusion of the 80/20 blend of HDPE/Nylon 6 with various levels of Kenamide W-20 is illustrated in the Table which clearly shows the reduction of the force to extrude the blend containing a small concentration of Kenamide W-20 compared to the blend without the Kenamide W-20.

The surface textures of the extrudates were examined with an optical microscope. Extrudates with no Kenamide W-20 exhibited a rough, distorted surface at all shear rates. A discernable improvement is surface smoothness was evident in samples containing even the lowest amount (0.5%) of Kenamide W-20, and a marked improvement is evident in the samples containing 2.0% Kenamide W-20 at all shear rates.

TABLE

|  | Example | | | |
|---|---|---|---|---|
|  | C | 1 | 2 | 3 |
|  | Force (lb.) at the Additive Level (%) | | | |
| Shear Rate, sec −1 | 0 | 0.5 | 1 | 2 |
| 75 | 140 | 110 | 110 | 110 |
| 150 | 210 | 190 | 170 | 150 |
| 300 | 250 | 220 | 210 | 200 |
| 750 | 390 | 340 | 330 | 310 |

I claim:

1. A film produced from a blend comprising at least 50 weight percent of a solid polymeric polyolefin selected from the group consisting of linear homopolymers of ethylene and of propylene and linear copolymers of ethylene and olefins of $C_4$ and higher; at least 5 weight percent of polymeric polyamide selected from the class of polyamides known as nylons; and, N,N'-ethylene bis-oleamide fatty acid amide in an amount sufficient to increase the surface smoothness of an extrudate prepared from the same proportions of said polyolefin and said polyamide without said fatty acid amide.

2. The composition of claim 1 in which said polyolefin comprises 60 to 90 weight percent of said composition.

3. The composition of claim 1 in which said polyamide is polycaprolactam or polyhexamethylene adipamide.

4. The composition of claim 2 in which said polyamide is polycaprolactam or polyhexamethylene adipamide.

* * * * *